Patented July 15, 1941

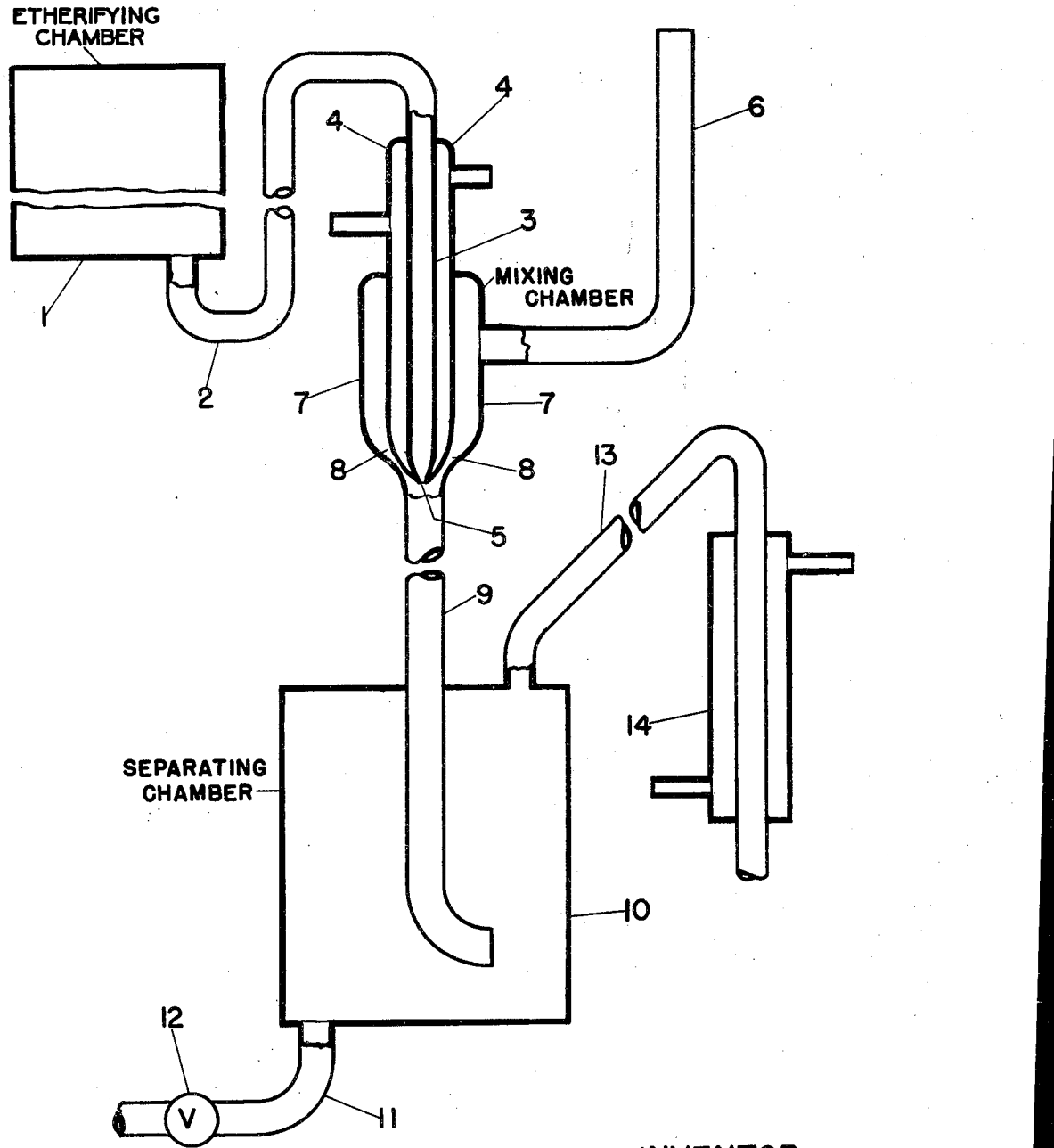

2,249,673

UNITED STATES PATENT OFFICE 2,249,673

CELLULOSE ETHER RECOVERY

Harold M. Spurlin, Wilmington, Del., assignor, by mesne assignments, of one-half to Hercules Powder Company, Wilmington, Del., a corporation of Delaware, and one-half to Dow Chemical Company, Midland, Mich., a corporation of Michigan Application September 28, 1937, Serial No. 166,197

31 Claims. (Cl. 260—232)

This invention relates to the separation of the lower alkyl ethers of cellulose from the product obtained by the etherification of alkali cellulose.

Alkyl ethers of cellulose, such as, for example, ethyl cellulose, are produced by the reaction of an inorganic alkyl ester such as ethyl chloride or diethylsulfate with an intimate mixture of cellulose and an alkali solution commonly referred to as alkali cellulose. The principal reaction involved is that between the inorganic alkyl ester and the alkali cellulose leading to the production of an alkyl ether of cellulose and an alkali salt. However, the inorganic alkyl ester present is hydrolyzed, with the resultant formation of by-products, such as, for example, when an ethyl halide is used, ethyl alcohol, ethyl ether, etc. When the reaction is completed, there accordingly remains the cellulose ether, the alkali salt, free alkali, water, and a mixture of the excess of inorganic alkyl ester together with the various alkyl alcohols and ethers formed by the side reactions.

It is an object of this invention to provide a simple method for the removal of the cellulose ether from the reaction product above, in a desirable state of purity. There are several general methods available for the isolation of a solid product from the solution in which it is made, but they suffer from several disadvantages as shown below:

(1) Precipitation with a non-solvent, miscible with the solvent. This method is practically necessary in cases where the solvent is so high boiling or unstable that it cannot be removed by simple drying. This method is used for many cellulose esters. However, no non-solvent is known which gives a usable, granular precipitate from all reaction mixtures.

(2) Removal of the solvent by direct application of heat and then grinding the solid left, to the desired size. This method is applicable where the solvent is volatile and non-inflammable and no non-volatile impurities are present. However, the apparatus for this method is expensive, and the steam consumption is fairly high, because of the indirect application of heat. The output is low, due to the slow rate of drying of colloid masses in relatively thick sheets, and the horny nature of the resulting product makes it difficult to wash out the salt and alkali.

Now, in accordance with my invention, I have found that a cellulose ether may be readily separated from the reaction product by a method which does not have the disadvantages of the prior processes above mentioned. I have found that I may boil off the volatile reaction products by discharging the cellulose ether-containing reaction product into an aqueous medium maintained above the boiling point of the volatile reaction products thereby breaking up the material before and as it drys, and end with a finely divided, water-wet product, from which the salt, etc., may be readily washed following the procedure more fully described below.

The reaction product from the etherification reaction is run out from the etherifying chamber hot, under its own pressure, by the aid of a pump, or by gravity, into a moving stream of steam, hot water, or any mixtures thereof, containing sufficient available heat to vaporize the volatile constituents therefrom. The cellulose ether is thus precipitated and the suspension is then led into a large chamber where, when using an alkyl halide, for example, for the etherification reaction, the unreacted alkyl halide, alkyl ether, as well as any other volatile constituents, are separated from the mixture. This leaves in the vessel an aqueous suspension of the ether in an alkali halide-alkali solution which may then be readily filtered in any equipment wherein the cellulose ether can be washed free of salt.

A number of different forms of apparatus may be used to carry out the process in accordance with this invention. I have found that an apparatus of the type shown diagrammatically on the attached drawing, which is a diagrammatic cross-section view of the apparatus, is well suited for this purpose.

I will now describe the operation of the process in accordance with my invention with particular reference to the attached drawing. The reaction mixture, comprising the alkyl ether of cellulose, excess alkylating agent, free alkali, alkyl salts, water, etc., and which is under a high pressure due to the reactants and to the reaction temperatures, as more fully described later, is passed from the etherifying chamber 1, through conduit 2, under its own pressure, into a nozzle 3, surrounded by a water jacket 4, and issues through the orifice 5, which preferably has an opening about $\frac{1}{32}$ inch to about $\frac{1}{4}$ inch in diameter. As the reaction mixture issues from the orifice 5, it strikes a concentric, high velocity stream of an aqueous medium which may be, for example, steam, hot water, or mixtures thereof, which enters the chamber 7, through conduit 6, and passes into the annular orifice 8, where it strikes the reaction mixture, precipitating the cellulose ether from said reaction mixture and simultaneously vaporizing the volatile constituents. The non-volatile and volatile components of the reaction mixture then pass through conduit 9, into the expansion chamber 10, from which the mixture of cellulose ether, salts, alkali, water, etc. may be continuously removed through conduit 11, equipped with a suitable valve 12. The volatile components of the reaction mixture are led off through conduit 13, into a condenser 14, where they are liquefied and thence recovered.

While the form of apparatus as shown in the drawing is applicable to the process wherein the reaction mixture is under a high pressure and thus is discharged through the atomizer under its own pressure, it will be understood that I am not limited thereto. For example, where the process used for making ethyl cellulose does not require super-atmospheric pressures, as for example, when using diethyl sulfate instead of ethyl chloride as the ethylating agent, the reaction mass in etherifying chamber 1 may be forced through atomizer 3, by means of a suitable pump, or the etherifying chamber 1 may be so placed that the reaction mass from said chamber is forced through atomizer 3 by gravity.

My process is particularly applicable to the separation of ethyl cellulose from the reaction product formed by reacting alkali cellulose with an inorganic alkyl ester such as for example ethyl chloride or diethyl sulfate. When using ethyl chloride the ethylation reaction is ordinarily carried out in the presence of an excess of ethyl chloride so that the reaction product contains unreacted ethyl chloride as well as ethyl alcohol and ethyl ether. In addition to these reaction products there may also be present in my process an inert reaction medium such as benzene, toluene, dioxan, etc., to promote more complete dispersion of the reactants.

The ethylation reaction is normally carried out at temperatures of about 100° C. to about 140° C. under pressure of about 150 to about 400 pounds gage. After completion of the reaction, the reaction product is preferably discharged from the etherifying chamber under its own pressure, which is about 150 to about 300 pounds gage into a moving current of steam, hot water, or mixtures thereof, preferably in a relatively small chamber in which the agitation of the ingredients is in a violent state. This is done by forcing the discharge through an atomizer, using the kinetic energy of the steam, hot water, or mixtures thereof to atomize the solution, and the heat content of the steam, hot water, or mixtures thereof to boil off the solvents and volatile impurities at the same time. The atomizer consists preferably of a water-cooled nozzle with an opening preferably about $\frac{1}{32}$ inch to about $\frac{1}{4}$ inch in diameter, said nozzle communicating with a jet, through which the steam, hot water, or mixtures thereof is passing with high velocity. The arrangement shown in the drawing, in which the nozzle is concentrically surrounded by a jet through which the steam, hot water or mixtures thereof is passing with high velocity, has been found most desirable. The cellulose ether so precipitated is in a finely divided condition and is then carried to a larger vessel preferably maintained under lower pressure and wherein the volatile components such as ethyl chloride, ethyl alcohol, ethyl ether, etc. separate from the mixture, leaving the precipitated ethyl cellulose in an aqueous suspension in the sodium chloride-alkali liquor. This aqueous suspension is then purified by washing out the salt, etc. leaving the ethyl cellulose in pure form.

Alternatively instead of using an alkyl halide for etherification I may also use an alkyl sulfate, such as, for example, diethyl sulfate, in the preparation of ethyl cellulose. In this case it is unnecessary to carry out the etherification at a superatmospheric pressure, an elevated temperature alone being sufficient. After the reaction is complete the reaction product is discharged from the etherifying chamber by means of a suitable pump, or by gravity, through the atomizer above described, whereby the ethyl cellulose is precipitated and the volatile materials are separated from the mixture in the same manner as before described. The non-volatile by-products, all of which are soluble in water may then be washed out leaving the ethyl cellulose in pure form.

There is ordinarily less trouble with coherence of the cellulose derivative grains if there is enough liquid water in the mixture after atomizing to form a slurry with the product. This excess water seems also to facilitate washing of the resulting precipitate. However, if enough attention is paid to mechanical details, such as avoidance of pockets, sharp bends, rough surfaces, etc., it is possible to operate with superheated steam, thereby avoiding the presence of liquid water in the precipitate. This is particularly advantageous if it is desired to recover the cellulose derivative from a solution containing no salt or other non-volatile substances.

I may also operate the process in accordance with my invention by adding sufficient water to the reaction mixture in the etherifying chamber after completion of the reaction, but before precipitation, to dissolve the salt, alkali, etc. This is done for the purpose of avoiding trouble which may be encountered due to the plugging of the lines and the nozzle by salt crystals. After the addition of water, the aqueous phase may be separated from the cellulose ether-containing phase, by settling or centrifuging and the cellulose ether solution then precipitated as herein described, or the mixture of the aqueous layer and cellulose ether-containing solution may be precipitated as herein described without previous separation thereof. It may also be desirable at times, depending upon the conditions existing, to add a solvent, such as, for example, benzene, toluene, etc., along with the water.

The process, according to my invention, is more specifically illustrated by the following example:

An autoclave is charged with 3800 parts by weight of alkali cellulose consisting of 18.4% cellulose, 57.1% of sodium hydroxide and 24.5% of water. To this is added 2820 parts by weight of ethyl chloride and 4300 parts by weight of benzene. The ethylation of the cellulose is carried out by maintaining the reaction mixture in a jacketed autoclave, the steam pressure in the jacket being approximately 40 pounds gage, until about 80% of the ethyl chloride has reacted, which will be in about 18 hours. At the end of this time 5000 parts by weight of water and 880 parts by weight of benzene are added to thin the mixture and the autoclave contents are fed through the precipitator, above described, into a steam-water mixture, using wet steam at 40 pounds gage pressure for the precipitation. This steam therefore has a temperature between 100° C. and 140° C., depending on the setting of the nozzle. For best operating conditions I have found that 5 to 15 pounds of steam are required per pound of ethyl cellulose.

The mixture of precipitated ethyl cellulose, which is in the form of white, spongy threads, together with steam, aqueous salt-alkali solution, volatile impurities, and solvent vapors are then led to a large vessel which is preferably under a lower pressure such as atmospheric pressure and wherein the volatile impurities and solvent vapors such as ethyl chloride, ethyl alcohol, ethyl ether, and benzene are flashed off and recovered by suitable condensers, these being preferably so arranged that all the condensate is cooled and collected together. The use of benzene has the advantage that it serves as a solvent for the ethyl chloride, thereby preventing losses of the latter. The aqueous suspension of ethyl cellulose remaining, after the volatile materials have flashed off, is then thoroughly washed to remove the last traces of salt, etc. The ethoxyl content of the ethyl cellulose after drying was approximately 48%.

My method of recovering the cellulose ethers from the products obtained by the etherification of alkali cellulose is valuable in that it is applicable to a continuous process and that only a simple apparatus is needed for its operation. Furthermore, it provides for a simultaneous removal of volatile constituents and most of the water-soluble constituents and produces a finely divided cellulose ether from which residual water-soluble material can be easily and completely removed.

Although I have described my method with particular reference to ethyl cellulose, it is also applicable to the separation of other lower alkyl ethers of cellulose such as, for example, propyl cellulose or methyl cellulose and to mixed alkyl ethers of cellulose, such as, for example, butyl-ethyl cellulose, etc., from the reaction products resulting from the etherification reaction of alkali cellulose. Therefore, it will be understood that where in my specification and claims I have referred to alkyl ethers of cellulose, I contemplate not only the ethyl ether of cellulose, but homologous alkyl ethers and mixed alkyl ethers of cellulose.

It will be understood that the procedure above given is illustrative only and that my principle of operation may be varied provided that the step or steps as hereinafter claimed are used.

What I claim and desire to protect by Letters Patent is:

1. In a method of separating a lower alkyl ether of cellulose from the product obtained by reacting alkali cellulose with an etherifying agent at elevated temperatures, the step which consists in discharging the cellulose ether-containing reaction product from the etherifying chamber into water maintained at a temperature above about 100° C. under superatmospheric pressures to precipitate the cellulose ether.

2. In a method of separating a lower alkyl ether of cellulose from the product obtained by reacting alkali cellulose with an etherifying agent at elevated temperatures under superatmospheric pressure, the step which consists in discharging the cellulose ether-containing reaction product from the etherifying chamber into water maintained at its boiling point under the pressure employed, to precipitate the cellulose ether.

3. In a method of separating a lower alkyl ether of cellulose from the product obtained by reacting alkali cellulose with an etherifying agent at elevated temperatures under superatmospheric pressure, the steps which consist in discharging the cellulose ether-containing reaction product from the etherifying chamber into water maintained at its boiling point under superatmospheric pressure, to precipitate the cellulose ether, and releasing the pressure on the aqueous suspension to flash off the volatile reaction products therefrom.

4. In a method of separating a lower alkyl ether of cellulose from the product obtained by reacting alkali cellulose with an etherifying agent at elevated temperatures under superatmospheric pressure, the steps which consist in discharging the cellulose ether-containing reaction product from the etherifying chamber under pressure into water maintained at a temperature above about 100° C. to precipitate the cellulose ether, releasing the pressure on the aqueous suspension to flash off the volatile reaction products therefrom, and separating the precipitated cellulose ether from the resulting aqueous solution.

5. In a method of separating a lower alkyl ether of cellulose from the product obtained by reacting alkali cellulose with an etherifying agent at elevated temperatures, the steps which consist in discharging, under pressure, the cellulose ether-containing reaction product from the etherifying chamber in the form of a spray into a current of an aqueous medium, maintained at a temperature above the boiling point of the volatile reaction products, leading such current into an expansion chamber to flash off volatile materials, and separating the precipitated cellulose ether from the resulting aqueous solution.

6. In a method of separating a lower alkyl ether of cellulose from the product obtained by reacting alkali cellulose with an etherifying agent at elevated temperatures under super-atmospheric pressure, the steps which consist in discharging the cellulose ether-containing reaction product from the etherifying chamber under pressure in the form of a spray into a current of water maintained at a temperature above 100° C. leading such current into an expansion chamber to flash off volatile materials therefrom by release of pressure, recovering said volatile materials, and separating the precipitated cellulose ether from the resulting aqueous solution.

7. In a method of separating ethyl cellulose from the product obtained by reacting alkali cellulose with an ethylating agent at elevated temperatures under super-atmospheric pressure, the step which consists in discharging the ethyl cellulose-containing reaction product from the ethylating chamber under pressure into water maintained at a temperature above about 100° C., to precipitate the ethyl cellulose.

8. A method of separating ethyl cellulose from the product obtained by reacting alkali cellulose with an ethylating agent at elevated temperatures under super-atmospheric pressure, in the presence of benzene, including the step which consists in discharging the ethyl cellulose-containing reaction mixture from the ethylating chamber under pressure into water maintained at a temperature above about 100° C., to precipitate the ethyl cellulose.

9. A method of separating ethyl cellulose from the product obtained by reacting alkali cellulose with an ethylating agent at elevated temperatures under super-atmospheric pressure, in the presence of toluene, including the step which consists in discharging the ethyl cellulose-containing reaction mixture from the ethylating chamber under pressure into water maintained at a temperature above about 100° C., to precipitate the ethyl cellulose.

10. A method of separating ethyl cellulose from the product obtained by reacting alkali cellulose with an ethylating agent at elevated temperatures under super-atmospheric pressure, in the presence of dioxan, including the step which consists in discharging the ethyl cellulose-containing reaction mixture from the ethylating chamber under pressure into water maintained at a temperature above about 100° C., to precipitate the ethyl cellulose.

11. In a method of separating ethyl cellulose from the product obtained by reacting alkali cellulose with an ethylating agent at elevated temperatures under super-atmospheric pressure, the steps which consist in discharging the ethyl cellulose-containing reaction product from the ethylating chamber under pressure into water maintained at a temperature above about 100° C., to precipitate the ethyl cellulose, and releasing the pressure on the aqueous suspension to flash off the volatile reaction products therefrom.

12. In a method of separating ethyl cellulose from the product obtained by reacting alkali cellulose with an ethylating agent at elevated temperatures under super-atmospheric pressure, the steps which consist in discharging the ethyl cellulose-containing reaction product from the ethylating chamber under pressure into water maintained at a temperature above about 100° C. to precipitate the ethyl cellulose, releasing the pressure on the aqueous suspension to flash off the volatile reaction products therefrom, and separating the precipitated ethyl cellulose from the resulting aqueous solution.

13. In a method of separating ethyl cellulose from the product obtained by reacting alkali cellulose with an ethylating agent at elevated temperature, the steps which consist in discharging, under pressure, the ethyl cellulose-containing reaction product from the ethylating chamber in the form of a spray into a current of an aqueous medium maintained at a temperature above the boiling point of the volatile reaction products, leading such current into an expansion chamber to flash off volatile materials therefrom by release of pressure, recovering said volatile materials and separating the precipitated ethyl cellulose from the resulting aqueous solution.

14. In a method of separating ethyl cellulose from the product obtained by reacting alkali cellulose with an ethylating agent at elevated temperatures under super-atmospheric pressure, the steps which consist in discharging the cellulose ether-containing reaction product from the ethylating chamber under pressure in the form of a spray into a current of water maintained at a temperature above 100° C., leading such current into an expansion chamber to flash off volatile materials therefrom by release of pressure, recovering said volatile materials, and separating the precipitated ethyl cellulose from the resulting aqueous solution.

15. In a method of separating a lower alkyl ether of cellulose from the product obtained by reacting alkali cellulose with an etherifying agent at elevated temperatures, the steps which consist, after completion of the reaction, in adding to the reaction mixture a controlled quantity of water, insufficient in amount to precipitate the cellulose ether, and discharging the so-treated cellulose ether-containing reaction product from the etherifying chamber into an aqueous medium maintained at a temperature above the boiling point of the volatile reaction products to precipitate the cellulose ether.

16. In a method of separating a lower alkyl ether of cellulose from the product obtained by reacting alkali cellulose with an etherifying agent at elevated temperatures the steps which consist, after completion of the reaction, in adding to the reaction mixture a mixture of a solvent for the cellulose ether and a controlled quantity of water, insufficient in amount to precipitate the cellulose ether, and discharging the so-treated cellulose ether-containing reaction product from the etherifying chamber into an aqueous medium maintained at a temperature above the boiling point of the volatile reaction products to precipitate the cellulose ether.

17. In a method of separating a lower alkyl ether of cellulose from the product obtained by reacting alkali cellulose with an etherifying agent at elevated temperatures the steps which consist, after completion of the reaction, in adding to the reaction mixture a controlled quantity of water, insufficient in amount to precipitate the cellulose ether yet sufficient to form an aqueous phase which contains in solution some of the water-soluble constituents of the reaction mixture, and to leave a cellulose ether-containing solution, separating the aqueous phase from the cellulose ether-containing solution and discharging said cellulose ether-containing solution into an aqueous medium maintained at a temperature above the boiling point of the volatile reaction products to precipitate the cellulose ether.

18. In a method of separating a lower alkyl ether of cellulose from the reaction mixture in which it was formed, the steps which consist in discharging said reaction mixture under pressure into a current of an aqueous medium maintained at a temperature above the boiling point of the volatile reaction products, leading such current into an expansion chamber to flash off the volatile materials and separating cellulose ether from the resulting aqueous solution.

19. In a method of separating a lower alkyl ether of cellulose from the reaction mixture in which it was formed, the steps which consist in discharging said reaction mixture under pressure in the form of a spray into a current of steam maintained at a temperature above the boiling point of the volatile reaction products, leading such current into an expansion chamber to flash off volatile materials and separating the precipitated cellulose ether from the resulting aqueous solution.

20. In a method of separating ethyl cellulose from the reaction mixture in which it was formed, the steps which consist in discharging said reaction mixture, under pressure, into a current of an aqueous medium maintained at a temperature above the boiling point of the volatile reaction products leading such current into an expansion chamber to flash off volatile materials and separating the precipitated ethyl cellulose from the resulting aqueous solution.

21. In a method of separating ethyl cellulose from the reaction mixture in which it was formed, the steps which consist in discharging said reaction mixture, under pressure, in the form of a spray into a current of steam maintained at a temperature above the boiling point of the volatile reaction products, leading such current into an expansion chamber to flash off volatile materials and separating the precipitated ethyl cellulose from the resulting aqueous solution.

22. In a method of separating a lower alkyl ether of cellulose from the product obtained by reacting alkali cellulose with an etherifying agent at elevated temperatures, the step which consists in discharging the cellulose ether-containing reaction product from the etherifying chamber in a confined and moving stream into a confined and moving stream of a steam-water mixture to precipitate cellulose ether, the said steam-water mixture being maintained at a temperature above about 100° C., being under super-atmospheric pressure, being present in an amount such that and being subjected to cooling so that after admixture with the cellulose ether-containing reaction product the precipitated cellulose ether is in the form of a freely moving slurry in liquid water.

23. In a method of separating a lower alkyl ether of cellulose from the reaction mixture in which it is formed, the step which consists in discharging the cellulose ether-containing reaction products from the etherifying chamber in a confined and moving stream into an aqueous medium likewise in a confined and moving stream and maintained at a temperature above the boiling point of the volatile, non-aqueous constituents of the reaction mixture, while maintaining such conditions of superimposed pressure on the system as to insure the presence of sufficient liquid water in the mixed streams to form a freely flowing slurry of precipitated cellulose ether in water.

24. The process which comprises flashing off the organic solvent from very fine particles of a solution of an alkyl cellulose in which the alkyl group is not above butyl in the homologous series in an organic solvent.

25. The process which comprises agitating a crude ethyl cellulose etherification mixture containing benzene to produce an emulsion of free flowing consistency, and flashing off volatile components by contacting the said emulsion with water at a temperature above the flashing-off point of benzene.

26. In the process of separating pure cellulose ether in which the substituent radical is not above butyl in the homologous series from its crude etherification mixture wherein the cellulose ether is dissolved in the volatile solvent, the step which comprises finely dividing the crude cellulose ether solution, and in the said state of division, contacting the same with a comparatively large volume of aqueous fluid maintained at a temperature above the boiling point of the solvent whereby the cellulose ether is obtained in fine granular form and the volatile solvent is flashed off.

27. In the process of separating pure ethyl cellulose from its crude etherification mixture containing benzene in an amount sufficient to cause solution of the ethyl cellulose, the steps which comprise emulsifying the ethyl cellulose solution, finely dividing the emulsion and contacting the finely divided emulsion with a relatively large volume of vigorously agitated aqueous liquid maintained above the boiling point of benzene.

28. The process which comprises preparing an emulsion of free flowing consistency of a solution of an alkyl cellulose in which the alkyl substituents are not above butyl in the homologous series, by agitating the crude etherification mixture with the addition of additional amounts of the volatile solvents present in the crude etherification mixture if necessary to obtain desirable thinning, finely dividing the emulsion, contacting the finely divided emulsion with water in a state of agitation and at a temperature above the flashing off point of the water immiscible solvent medium in which the alkyl cellulose is dissolved.

29. The process which comprises flashing off the organic solvent material from very fine particles of the product obtained by reacting alkali cellulose with an ethylating agent at elevated temperatures under super-atmospheric pressure.

30. The process which comprises agitating a crude ethyl cellulose etherification mixture containing benzene, and discharging said agitated etherification mixture into water above the flashing-off point of benzene.

31. A method of separating ethyl cellulose from the reaction product obtained by reacting alkali cellulose with an ethylating agent at elevated temperatures under super-atmospheric pressure in the presence of benzene, including the step which consists in forcing the said reaction product into water maintained at a temperature above the boiling point of the volatile reaction products to precipitate the ethyl cellulose.

HAROLD M. SPURLIN.